(No Model.) 2 Sheets—Sheet 2.
S. L. ALLEN.
COMBINED HARROW, CULTIVATOR, AND PULVERIZER.
No. 463,609. Patented Nov. 24, 1891.
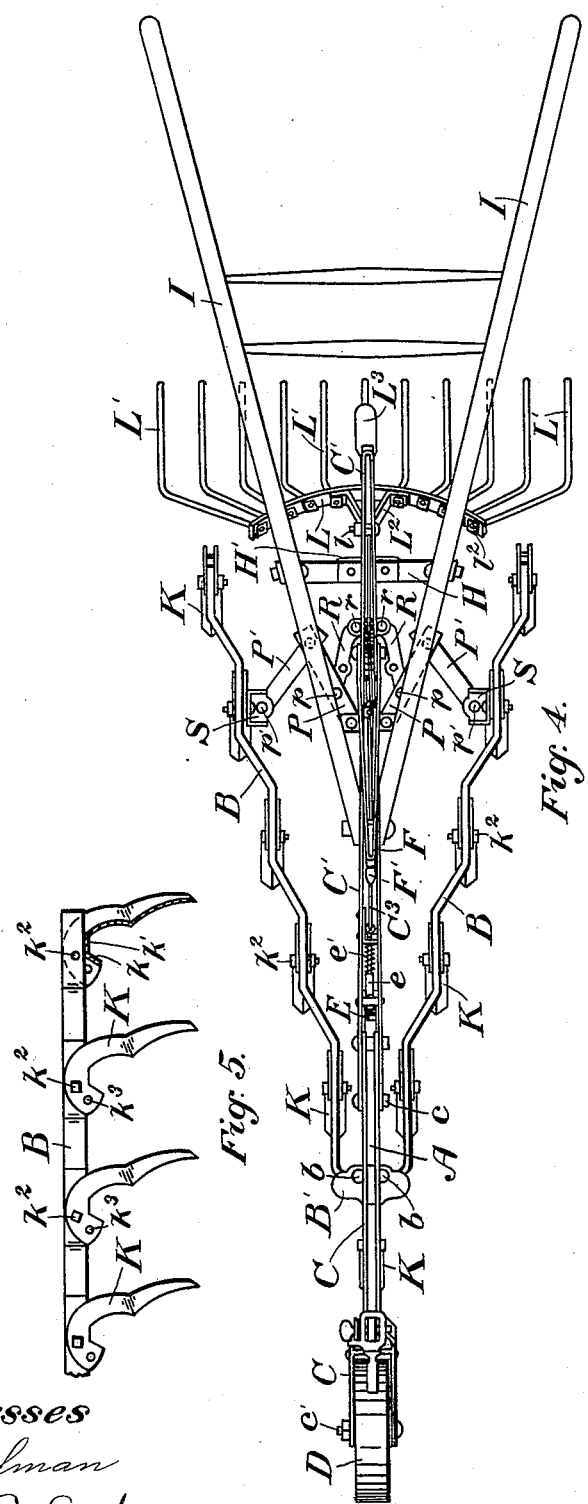
Witnesses
E. H. Gilman
Albert E. Leach
Inventor
Sam. L. Allen
by Wm. B. H. Downs
Atty.

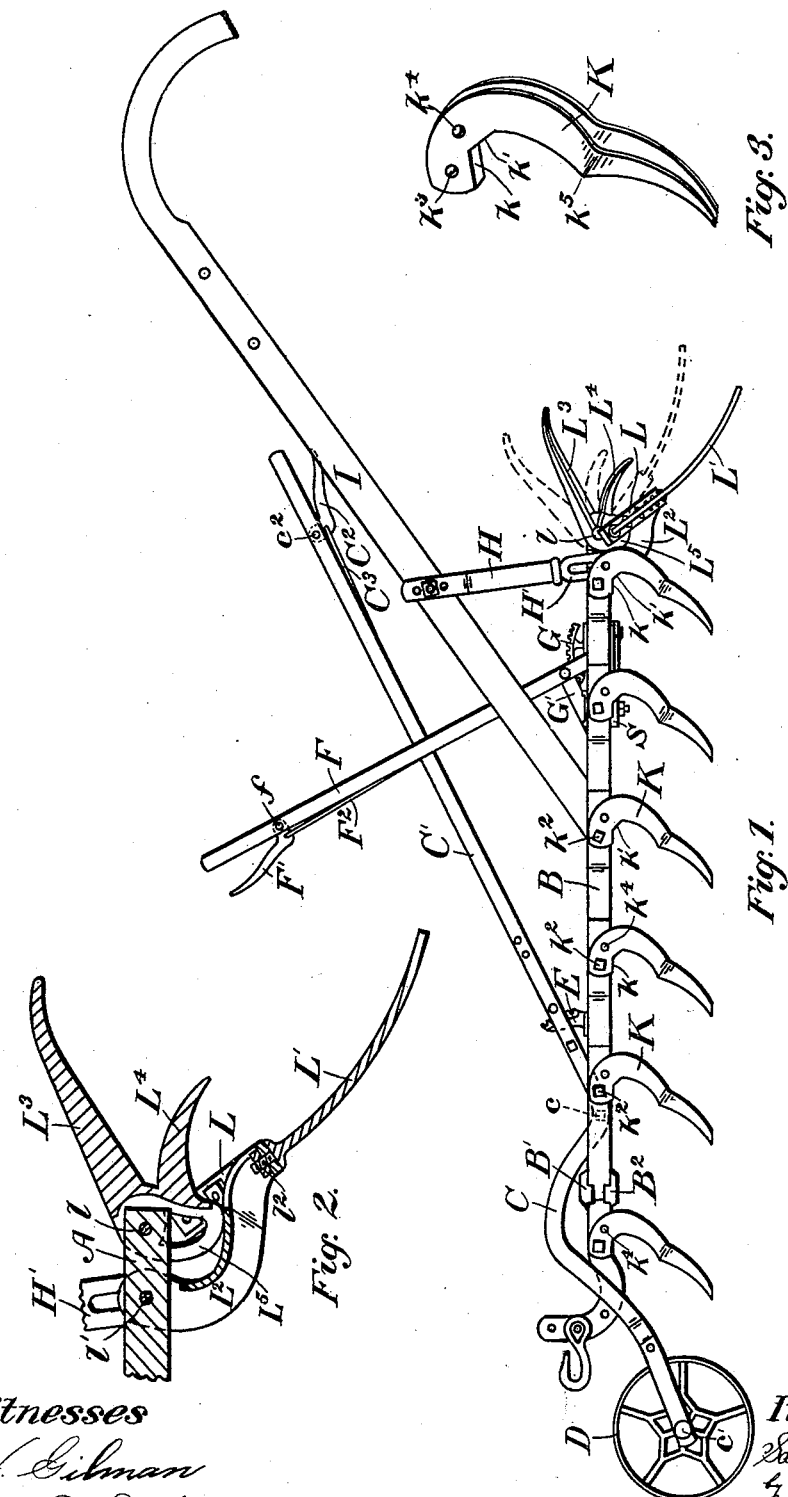

UNITED STATES PATENT OFFICE.

SAMUEL L. ALLEN, OF CINNAMINSON, NEW JERSEY.

COMBINED HARROW, CULTIVATOR, AND PULVERIZER.

SPECIFICATION forming part of Letters Patent No. 463,609, dated November 24, 1891.

Application filed February 28, 1891. Serial No. 383,160. (No model.)

*To all whom it may concern:*

Be it known that I, SAMUEL L. ALLEN, a citizen of the United States, residing at Cinnaminson, in the county of Burlington and State of New Jersey, have invented a certain new and Improved Harrow, Cultivator, and Pulverizer Combined, of which the following is a full specification.

My invention consists in certain improved features of construction in cultivators, whereby among other advantages the same implement may be used as a harrow and pulverizer as well as a cultivator. Moreover, I provide the implement with improved arrangements for regulating in a ready manner the depth at which the teeth penetrate the ground in harrowing, pulverizing, or cultivating, the details of construction and operation being hereinafter set forth.

Referring to the accompanying drawings, Figure 1 is a side elevation of my improved implement. Fig. 2 is an enlarged sectional view showing the action of the pulverizer. Fig. 3 is a perspective view of one of the cultivator and harrow teeth. Fig. 4 is a plan view of the implement, and Fig. 5 shows the side bar with teeth turned backward for harrowing.

A is the central bar, and B the side bars forming the frame of the implement, the side bars being hinged or jointed in front between the hinge-plates B' B², which are bolted together and to the central bar A at $b$. These side bars B are adjustable laterally with reference to the central bar by means of the handle-lever F, which operates, through the links G' P P' and R, pivoted together and to the bar connections at $p$ $p'$ and $r$, to widen apart or draw together the side bars in a manner similar to that described and claimed in United States Letters Patent No. 424,946, for an improvement in cultivators issued to me April 8, 1890, to which reference is hereby made.

G is a curved tooth-piece, in the teeth of which a spring-stop engages, operated by the rod or wire F², through the handle F', thus determining positively the width of the frame, the complete adjustment of the side bars by means of the handle-lever being practically identical with that shown in the Letters Patent above referred to, so that further description of this adjustment is unnecessary.

I I are the handles secured to the central bar and supported by the brace H and bracket H'.

The side bars B are bent into a number of steps, as shown in Fig. 4, a tooth being attached to each step, the shape and arrangement being such that each tooth clears by a regular distance the tooth immediately in front. These steps are parallel to the line of motion when the side bars are opened out to medium width. By this peculiar shape of side bar a large number of the teeth may be secured to each in such a manner that each tooth runs in a different line or row, these lines or rows being close together, so that the implement is particularly adapted for fine cultivation. In the present implement I have shown the side bars bent into five steps, so that there are ten teeth secured to the side bars. I preferably also secure for ordinary work a tooth to the central bar, also in front of the hinge-plates B B'. The teeth are of peculiar shape and construction. Instead of being made in the ordinary manner of two pieces, a cast standard and a steel blade bolted thereto, I make my improved tooth K for this implement in one piece only, preferably of plate steel forged up in the shape shown in Fig. 3, though the blade or cutting part may be of any width or shape, the standard and blade being integral. The rearmost tooth in Fig. 5 I have shown in section, in order to better illustrate its construction. The tooth has two rearwardly-bent wings or flanges from the top to the bottom thereof, these flanges or wings being narrowed quite close together through the standard portion of the tooth or that part that is secured to the frame, while the lower portion is widened out in the manner shown in Fig. 3 to form a cutting-blade. The flanges embrace the bar of the cultivator-frame to which the tooth is attached, the junction of the flanges preferably forming a flat seat $k$, against which the frame-bar rests when the tooth is in place. This arrangement is such that the tooth is secured to the bar by a single fastening-bolt $k^2$ and at the same time held quite firmly either for harrowing or ordinary cultivating.

Each tooth is provided with two holes $k^3$ $k^4$ through both flanges thereof, and preferably has the two flattened seats $k$ $k'$ corresponding thereto, being so arranged that the single fastening-bolt $k^2$ may secure the tooth to the frame-bar through either of the holes $k^3$ $k^4$. In the one position the teeth point forward, as shown in Fig. 1. In the other position they point backward, as shown in Fig. 5. When the tooth is bolted through the front bolt-hole $k^3$, the bar to which it is secured rests on the seat $k$. When bolted through the rear bolt-hole $k^4$, the bar rests upon the seat $k'$.

With the teeth turned backward in the position shown in Fig. 5 the implement is admirable for trashy ground and leveling and for crops just breaking the surface.

The peculiar shape of the tooth is such as to offer a very unusual amount of wearing-surface. They may be worn off three inches before requiring renewal and yet retain their original cutting width, the width being the same from the bottom of the tooth to the recurved throat $k^5$. Being symmetrical they are set straight on the frame and being held by a single bolt may easily be removed or reversed in position. Being made out of one piece of metal they are cheap, strong, and devoid of bolt-holes in the face of the plate.

The depth at which the cultivator-teeth penetrate the surface is determined by the wheel D in front, and by the pulverizer attachment, presently to be described, in the rear. The wheel D is journaled between the bars C, which are bolted together, one on each side of the central bar A, to form a rigid open lever pivoted at $c$ to said central bar. The opposite arm of this lever C to that which bears the front wheel D is secured to the open handle-bar C', so that the two parts C C' form virtually a single rigid lever pivoted directly to the frame. By the movement of this handle up or down, the wheel D is elevated or depressed.

$C^2$ is a secondary handle pivoted in the open handle-bar C', near the upper end thereof, operating, through the rod $C^3$, the spring-stop $e$, which engages with the teeth on the convexly-curved piece E. In this manner the wheel D may be readily adjusted and set in any desired position up or down, thus regulating in front the depth of the cut of the cultivator-teeth. The wheel D may, if desired, be replaced by a pair of steel runners, which, like the wheel, regulate the depth, being operated up and down by the handle-lever C', but being adapted to slide instead of roll along the ground.

The open handle-levers C' and F are so arranged as to stiffen each other laterally. To this end one handle-lever works within the other, both operating in the same plane and each serving to support the other against lateral strain.

The pulverizer consists of a frame pivoted to the rear of the central bar A and having rearwardly and downwardly extending teeth or tines, with a foot-operated cam adapted to regulate the angular position of the pulverizer, and thus the depth of the cultivator or harrow teeth in the rear.

As herein shown, L is the curved head of the pulverizer, to which are secured the rearwardly and downwardly projecting tines L', the outer tines being bent in the shape shown in Fig. 4, so as to give a wide sweep to the pulverizer. Each tine has at its upper end a flanged seat resting against the under surface of the head, and a bolt passing through said head and held by a nut $l^2$ on the upper surface thereof. (See Fig. 2.)

$L^2$ is the shank-piece rigidly secured to the head L and pivoted at $l'$ to the central bar A. The operating-pedals are $L^3$ $L^4$, preferably cast integral with a cam portion $L^5$, which is pivoted at $l$ to the central bar and adapted to bear against the top surface of the shank-piece $L^2$. The construction is such that when the operator bears down with his foot upon the pedal $L^4$ the teeth L' of the pulverizer will be held quite deeply in the ground, the shank $L^2$ bearing upward against the lowest portion of the cam $L^5$.

When it is desired to raise the pulverizer, as indicated by dotted lines in Fig. 1, the operator places his foot under the pedal $L^3$ and presses upward, the weight of the implement causing the pulverizer to rise and keep the top of the shank-piece $L^2$ in contact with the cam. Thus by means of the adjustable lever-wheel in front and the adjustable pulverizer behind, the depth of cut of the teeth of the implement is very accurately and readily regulated.

By means of the peculiar method of attachment of the pulverizer-tines to the head thereof the pulverizer may be reduced in width by taking off the outside teeth, or the whole implement can be used to straddle a row when desired in cultivating by taking out the middle teeth of both cultivator and pulverizer.

The handle-lever C' may, if desired, be made of heavy metal and carried farther backward than is shown, and bent to act as a single handle for the implement, by which it is guided, the handles I I being in this case dispensed with altogether.

I claim—

1. A cultivator or harrow provided with a pulverizer, consisting of a head formed of a curved bar having downwardly and rearwardly extending detachable tines, each of which is provided with a flanged seat and bolt at the end of the tine and integral therewith secured by a nut to said head, whereby certain of the tines may be readily removed, substantially as and for the purposes described.

2. A pulverizer consisting of a head having tines secured thereto, and a shank-piece secured to said head and pivoted to the frame of the implement of which the pulverizer forms a part, in combination with a foot-operated cam pivoted to said frame and engaging with said shank-piece, substantially as described.

3. A pulverizer consisting of a head L, having tines L' secured thereto, and a shank-piece L², secured to said head and pivoted to the frame of the implement of which the pulverizer forms a part, in combination with a cam L⁵, also pivoted to said frame and provided with pedals L³ L⁴, substantially as described.

4. The combination, in a harrow or cultivator, of an adjustable handle-operated lever pivoted to the front of the frame of the implement, having a gage-wheel journaled to the front of said lever, a pulverizer consisting of a series of rearwardly and downwardly extending tines secured to a head pivotally connected to the rear of the implement frame, and a foot-operated cam for adjusting said pulverizer angularly, substantially as and for the purposes described.

5. A harrow or cultivator tooth the standard of which is doubly flanged to embrace the frame-bar, said standard being provided with transverse bolt-holes through the flanges, and flat seats $k\ k'$, forming an angle to each other at the junction of said flanges, so arranged with respect to the bolt-holes that a single transverse bolt secures the tooth to the bar either in a direct or reverse position, substantially as described.

6. An integral cultivator-tooth struck up from a plate of metal, having a front cutting-edge and rear flanges on either side which extend upward and embrace the bar and narrow downward to the point and secured by a single bolt, but having two bolt-holes and two seats $k\ k'$, whereby the tooth may be adjusted on the bar to point forward or backward, substantially as shown and described.

In witness whereof I have hereunto set my hand.

SAMUEL L. ALLEN.

Witnesses:
OSWALD SMITH,
A. L. JACOBY.